April 7, 1936. F. BALENSIEFER 2,036,910
TRUCK CHOCK AND ANCHOR
Filed March 27, 1935 2 Sheets-Sheet 1

Inventor
Frank Balensiefer
By Clarence A. O'Brien
Attorney

April 7, 1936.  F. BALENSIEFER  2,036,910
TRUCK CHOCK AND ANCHOR
Filed March 27, 1935  2 Sheets-Sheet 2
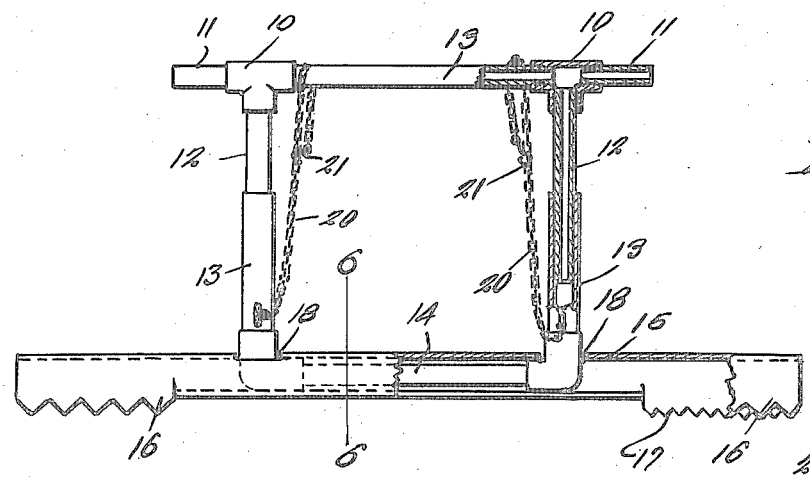
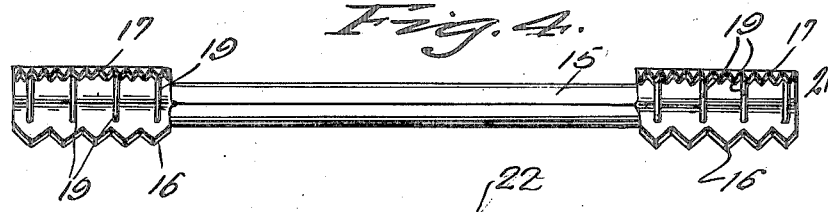
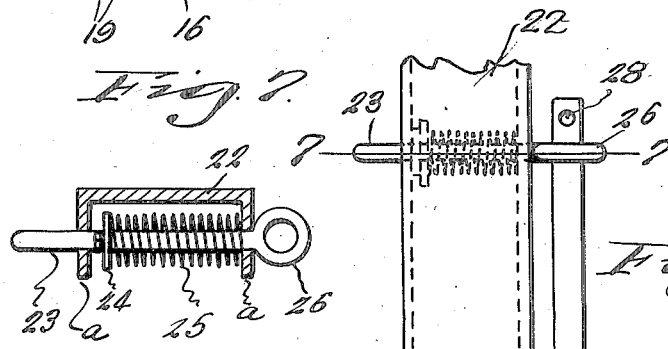
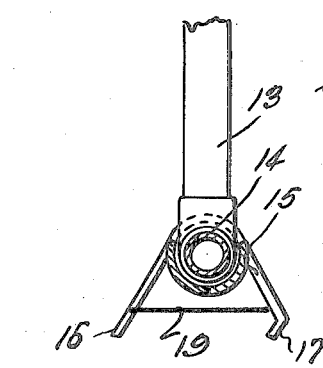
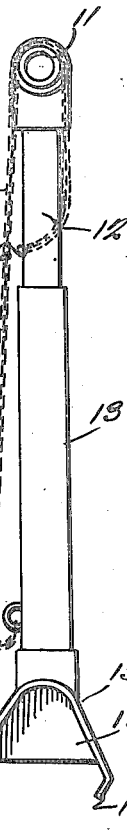
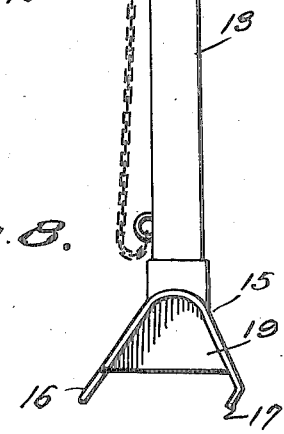
Inventor
Frank Balensiefer
By Clarence A. O'Brien
Attorney Patented Apr. 7, 1936

2,036,910

UNITED STATES PATENT OFFICE 2,036,910

TRUCK CHOCK AND ANCHOR

Frank Balensiefer, Fowler, Ind.

Application March 27, 1935, Serial No. 13,329

2 Claims. (Cl. 188—4)

This invention appertains to new and useful improvements in the general art of brakes and more particularly to an improved chock.

The principal object of the present invention is to provide a chock for trucks and other vehicles which will act as a positive anchor against movement of the vehicle.

Another important object of the invention is to provide an improved chock for heavy duty vehicles wherein the chock can be conveniently operated from the cab of the vehicle, and from a point adjacent the driver's seat.

These and various other important objects and advantages of the invention will become apparent to the reader of the following specification:

In the drawings:

Figure 3 represents a top plan view of the chock with parts in section and broken away to disclose the details thereof.

Figure 4 represents a bottom plan view of the chock.

Figure 5 represents an end elevational view of the chock and sustaining means.

Figure 6 represents a fragmentary vertical sectional view taken substantially on line 6—6 of Figure 3.

Figure 7 represents a sectional view taken substantially on line 7—7 of Figure 8.

Figure 8 represents a fragmentary top plan view of the latch.

Figure 1:
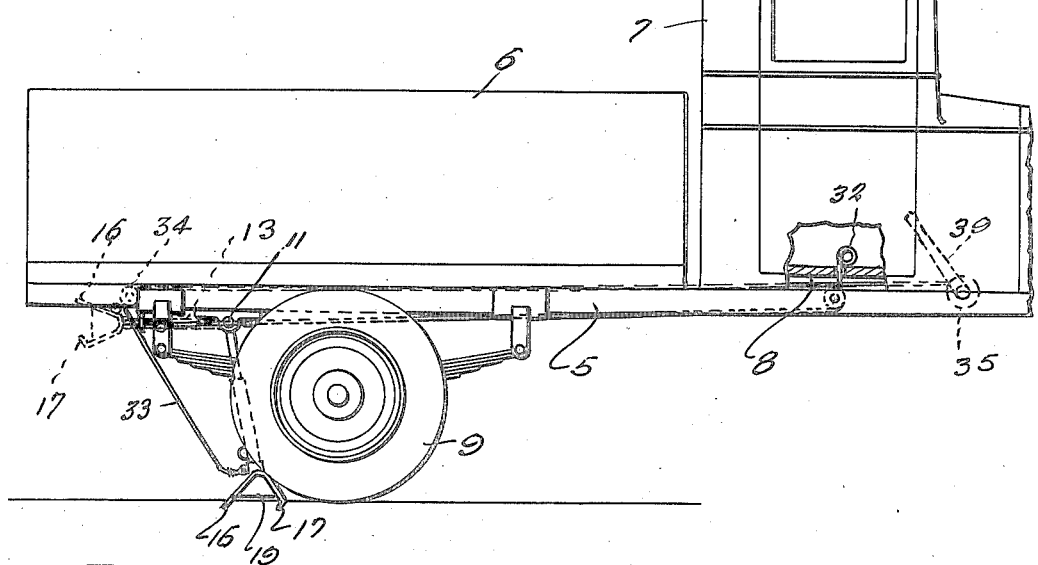
Figure 1 represents a fragmentary side elevational view of a truck showing the chock in operated position.

Referring to the drawings wherein like numerals designate like parts, it can be seen that numeral 5 represents the bed of the truck upon which is the body or box 6 and the cab 7, the cab being provided with the floor 8. Numeral 9 represents the rear wheels of the truck.

The truck is in itself substantially shown in Figure 3, the same involving a pair of T-members 10—10 which are provided with short pipe extensions to provide pintles 11—11 and parallel leg members 12—12. The remaining projections of the T-members 10 are connected by the pipe section 13. The pintles 11—11 are disposed through bearings 13 on the side bars of the bed 5 of the truck, while the lugs 12 extend into the tubular upstanding leg members 13 of the U-shaped structure 14. The ground engaging part of the chock consists of the elongated member which is preferably constructed of sheet metal and denoted by numeral 15. This ground engaging element 15 is of substantially inverted V-shape in cross section, the ends of which for a substantial distance inwardly at each edge being provided with teeth, the teeth at the rear edges being substantially large and denoted by numeral 16 while the teeth 17 at the forward edge of the member 15 are sharper teeth and diverge backwardly in the manner substantially shown in Figure 5.

The intermediate portion of the member 15 is bent around the bight portion of the U-shaped structure 14 and provided with openings 18 in the upper portion thereof through which the leg portion 13 of the U-shaped structure 14 extends.

Transversely extending web like members 19 extend between the toothed portions of the ground engaging element 15 and serve not only to reinforce these end portions but also serve to somewhat prevent lateral slipping of the truck.

Each of the leg portions 13 has a chain 20 extending therefrom and this chain at its upper end is disposed over the connecting pipe section 13 between the T-members 10 and provided with a hook 21 which is hooked through some intermediate link of the chain, this chain serving to limit the extensibility of the legs 12—13.

An elongated channeled member 22, has the channel thereof facing downward.

Figure 2:
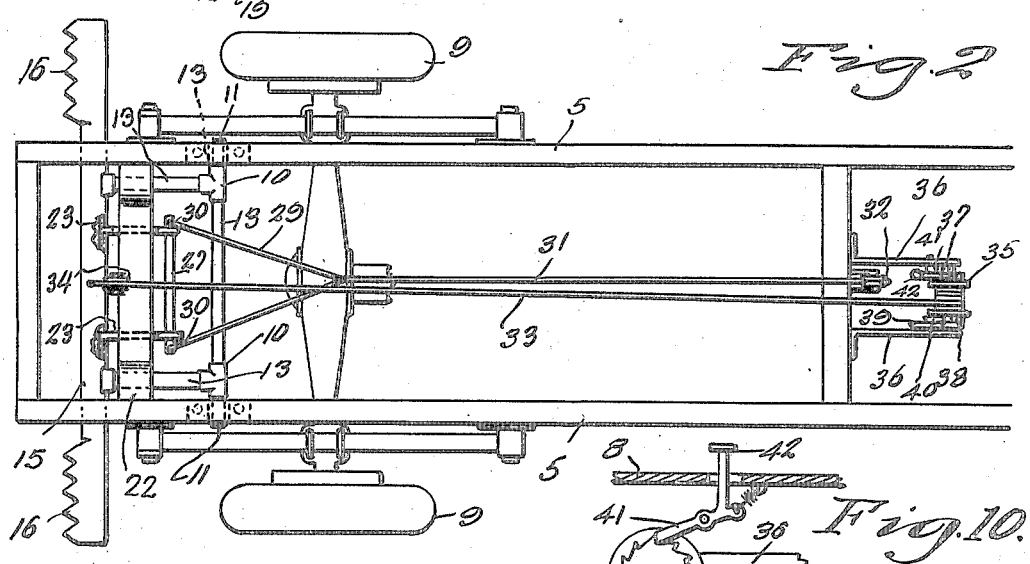
Figure 2 represents a fragmentary top plan view showing the chassis of the truck and the chock in inoperative position.
Figure 10:
Figure 10 represents a side elevational view of the drum released.
Figure 9:
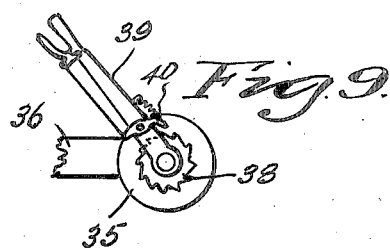
Figure 9 represents a side elevational view of the drum feed.

Through the depending flanges A—A of the channeled member 22 extend the slide pins 23—23, each of which is provided with a cross member 24 thereon between which and the inner side of the forward flange 8 a coiled, compressible spring 25 is interposed. The forward end of each of the ends 23 is provided with an eye 26 and extending through these eyes is the bar 27, each end of which is provided with an opening 28. A V-shaped rod member 29 has its ends hooked through the openings 28 as shown in Figure 2, while its intermediate portion is connected by the cable 31 to the ring 32 located in the cab 7. Normally when the chock is elevated, these pins 23 engage into openings in the intermediate portion of the ground engaging element 15.

As is clearly shown in Figure 2, a cable 33 extends from the intermediate portion of the ground engaging element 15, over a pulley 34 to a drum 35 located adjacent the floor of the cab 7. This drum 35 is supported by the bracket 36—36 and is provided with a ratchet wheel 37 at one end and a ratchet wheel 38 at its opposite end. A swingable hand lever 39 is provided with a hand controlled pawl 40 which engages the ratchet wheel 38 and obviously by oscillating this hand lever 39 the drum can be rotated to wind the cable 33 and lift the element 15 from ground engaged position and as the drum is rotated the dog 41 engages the ratchet wheel 37 and retains the same. When it is desired that the ground engaging element 15 be lowered, the ring 32 is pulled and at the same time the foot of the driver engages the pedal 42 which rises from the dog 41. The pedal tilts the dog 41 so that it disengages from the ratchet wheel 37 and with the pins 23 disengaged from the ground engaging element 15, the same will swing to ground engaged position as shown in Figure 1.

While the foregoing specification sets forth the invention in specific terms, it is to be understood that numerous changes in the shape, size and materials may be resorted to without departing from the spirit and scope of the invention as claimed hereinafter.

What is claimed is:

1. A chock for vehicles comprising an elongated member swingably connected to the rear portion of the vehicle, said member being provided with teeth at the end portions thereof, and means whereby the member can move to ground engaging position, the connection between said elongated member and the vehicle consisting of tubular members extending from the elongated member and swingable rods extending from the vehicle and into the tubular members.

2. A chock for vehicles comprising an elongated member swingably connected to the rear portion of the vehicle, said member being provided with teeth at the end portions thereof, and means whereby the member can move to ground engaging position, the connection between said elongated member and the vehicle consisting of tubular members extending from the elongated member and swingable rods extending from the vehicle and into the tubular members, and extension limiting means for the tubular members and rods.

FRANK BALENSIEFER.